United States Patent
Hudgons et al.

(10) Patent No.: US 9,477,581 B2
(45) Date of Patent: *Oct. 25, 2016

(54) INTEGRATED SYSTEM AND METHOD FOR VALIDATING THE FUNCTIONALITY AND PERFORMANCE OF SOFTWARE APPLICATIONS

(71) Applicant: JPMorgan Chase Bank, N.A., New York, NY (US)

(72) Inventors: Morrisha Hudgons, Chicago, IL (US); Michael E. Frank, Chicago, IL (US); Judit Lukashevich, Buffalo Grove, IL (US); Alex Rheingans, Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,554

(22) Filed: Mar. 26, 2013

(65) Prior Publication Data

US 2013/0205172 A1    Aug. 8, 2013

Related U.S. Application Data

(63) Continuation of application No. 12/979,723, filed on Dec. 28, 2010, now Pat. No. 8,434,058, which is a continuation of application No. 11/375,043, filed on Mar. 15, 2006, now Pat. No. 7,895,565.

(51) Int. Cl.
    *G06F 9/44*     (2006.01)
    *G06F 11/36*    (2006.01)
(52) U.S. Cl.
    CPC ....... *G06F 11/3684* (2013.01); *G06F 11/3672* (2013.01)
(58) Field of Classification Search
    None
    See application file for complete search history.

(56) References Cited

U.S. PATENT DOCUMENTS

| 4,751,702 | A | | 6/1988 | Beier et al. |
| 4,819,233 | A | * | 4/1989 | Delucia et al. ............... 717/129 |

(Continued)

FOREIGN PATENT DOCUMENTS

| EP | 1420344 | 11/2003 |
| WO | WO 01/74043 | 10/2001 |
| WO | WO2012087330 | 6/2012 |

OTHER PUBLICATIONS

Duggan, 2.40 General—Reviews and Abstracts, SPI Database of Software Technologies, p. 1-5, Feb. 1, 1974.

(Continued)

*Primary Examiner* — Tuan Q. Dam
*Assistant Examiner* — Zheng Wei
(74) *Attorney, Agent, or Firm* — Goodwin Procter LLP

(57) ABSTRACT

The system and method presented provides a multi-phase, end-to-end integrated process for testing application software using a standard software testing tool. The system and method involve integrating the functional, automated regression and performance phases of software application testing by leveraging deliverables at each phase so that the deliverables may be efficiently reused in subsequent test phases. Deliverables such as functional and technical test conditions and manual test scripts are used as inputs for each phase of the integrated tests. The use of leveraged requirements-based deliverables between test phases significantly reduces much of the repetitive testing typically associated with functionality and performance testing and minimizes repetition of testing errors discovered in earlier test phases. This integrated system and method for validating the functionality and performance of software applications by leveraging deliverables provides enhanced efficiencies, test procedure consistency throughout multiple test phases, consistent test results and high quality software applications.

20 Claims, 8 Drawing Sheets

(56) References Cited

U.S. PATENT DOCUMENTS

| | | | |
|---|---|---|---|
| 5,027,269 A | 6/1991 | Grant et al. | |
| 5,075,881 A | 12/1991 | Blomberg et al. | |
| 5,233,611 A * | 8/1993 | Triantafyllos et al. | 714/46 |
| 5,313,616 A | 5/1994 | Cline et al. | |
| 5,347,518 A | 9/1994 | Lee | |
| 5,446,895 A | 8/1995 | White et al. | |
| 5,539,885 A | 7/1996 | Ono et al. | |
| 5,563,998 A | 10/1996 | Yakish et al. | |
| 5,565,316 A | 10/1996 | Kershaw et al. | |
| 5,566,297 A | 10/1996 | Devarakonda | |
| 5,594,863 A | 1/1997 | Stiles | |
| 5,630,047 A | 5/1997 | Wang | |
| 5,630,069 A | 5/1997 | Flores et al. | |
| 5,655,074 A | 8/1997 | Rauscher | |
| 5,677,997 A | 10/1997 | Talatik | |
| 5,701,471 A | 12/1997 | Subramanyam | |
| 5,712,971 A | 1/1998 | Stanfill et al. | |
| 5,721,913 A | 2/1998 | Ackroff et al. | |
| 5,724,273 A | 3/1998 | Desgrousilliers et al. | |
| 5,748,878 A | 5/1998 | Rees et al. | |
| 5,752,034 A | 5/1998 | Srivastava | |
| 5,758,061 A | 5/1998 | Plum | |
| 5,768,506 A | 6/1998 | Randell | |
| 5,781,448 A | 7/1998 | Nakamura et al. | |
| 5,784,562 A | 7/1998 | Diener | |
| 5,799,297 A | 8/1998 | Goodridge et al. | |
| 5,806,075 A | 9/1998 | Jain et al. | |
| 5,828,883 A | 10/1998 | Hall | |
| 5,835,770 A | 11/1998 | Shum et al. | |
| 5,845,292 A | 12/1998 | Bohannon et al. | |
| 5,872,976 A | 2/1999 | Yee et al. | |
| 5,881,237 A | 3/1999 | Schwaller et al. | |
| 5,884,037 A | 3/1999 | Aras et al. | |
| 5,903,721 A | 5/1999 | Sixtus | |
| 5,903,897 A | 5/1999 | Carrier, III et al. | |
| 5,905,856 A | 5/1999 | Ottensooser | |
| 5,913,023 A * | 6/1999 | Szermer | 714/38.1 |
| 5,920,719 A | 7/1999 | Sutton et al. | |
| 5,937,198 A | 8/1999 | Nelson et al. | |
| 5,960,196 A | 9/1999 | Carrier, III et al. | |
| 5,960,445 A | 9/1999 | Tamori et al. | |
| 5,974,572 A | 10/1999 | Weinberg et al. | |
| 6,002,869 A * | 12/1999 | Hinckley | G06F 11/3696 714/35 |
| 6,003,075 A | 12/1999 | Arendt et al. | |
| 6,009,274 A | 12/1999 | Fletcher et al. | |
| 6,026,237 A | 2/2000 | Berry et al. | |
| 6,028,938 A | 2/2000 | Malkin et al. | |
| 6,029,002 A | 2/2000 | Afifi et al. | |
| 6,058,393 A | 5/2000 | Meier et al. | |
| 6,067,412 A | 5/2000 | Blake et al. | |
| 6,073,107 A | 6/2000 | Minkiewicz et al. | |
| 6,088,700 A | 7/2000 | Larsen et al. | |
| 6,101,601 A | 8/2000 | Matthews et al. | |
| 6,108,673 A | 8/2000 | Brandt et al. | |
| 6,125,390 A | 9/2000 | Touboul | |
| 6,128,708 A | 10/2000 | Fitzpatrick et al. | |
| 6,138,112 A | 10/2000 | Slutz | |
| 6,145,120 A | 11/2000 | Highland | |
| 6,145,121 A | 11/2000 | Levy et al. | |
| 6,175,833 B1 | 1/2001 | West et al. | |
| 6,195,676 B1 | 2/2001 | Spix et al. | |
| 6,230,319 B1 | 5/2001 | Britt, Jr. et al. | |
| 6,237,035 B1 | 5/2001 | Himmel et al. | |
| 6,237,143 B1 | 5/2001 | Fontana et al. | |
| 6,243,862 B1 | 6/2001 | Lebow | |
| 6,247,029 B1 | 6/2001 | Kelley et al. | |
| 6,249,877 B1 | 6/2001 | Kawakami et al. | |
| 6,269,479 B1 | 7/2001 | Puram | |
| 6,275,976 B1 * | 8/2001 | Scandura | 717/120 |
| 6,279,039 B1 | 8/2001 | Bhat et al. | |
| 6,301,701 B1 | 10/2001 | Walker et al. | |
| 6,311,327 B1 | 10/2001 | O'Brien et al. | |
| 6,337,696 B1 | 1/2002 | Lindhorst et al. | |
| 6,363,499 B1 | 3/2002 | Delo et al. | |
| 6,363,524 B1 | 3/2002 | Loy | |
| 6,405,250 B1 | 6/2002 | Lin et al. | |
| 6,405,364 B1 | 6/2002 | Bowman-Amuah | |
| 6,411,910 B1 | 6/2002 | Eulau et al. | |
| 6,415,396 B1 * | 7/2002 | Singh | G06F 11/3688 714/25 |
| 6,424,981 B1 | 7/2002 | Isaac et al. | |
| 6,438,749 B1 | 8/2002 | Chamberlain | |
| 6,446,126 B1 | 9/2002 | Huang et al. | |
| 6,463,454 B1 | 10/2002 | Lumelsky et al. | |
| 6,466,980 B1 | 10/2002 | Lumelsky et al. | |
| 6,467,052 B1 | 10/2002 | Kaler et al. | |
| 6,470,464 B2 | 10/2002 | Bertram et al. | |
| 6,477,471 B1 | 11/2002 | Hedstrom et al. | |
| 6,502,207 B1 | 12/2002 | Itoh et al. | |
| 6,505,176 B2 | 1/2003 | DeFrancesco, Jr. et al. | |
| 6,513,154 B1 | 1/2003 | Porterfield | |
| 6,519,763 B1 | 2/2003 | Kaufer et al. | |
| 6,526,443 B1 | 2/2003 | Goldsmith et al. | |
| 6,546,506 B1 | 4/2003 | Lewis | |
| 6,560,580 B1 | 5/2003 | Fraser et al. | |
| 6,578,004 B1 | 6/2003 | Cimral et al. | |
| 6,578,006 B1 | 6/2003 | Saito et al. | |
| 6,584,447 B1 | 6/2003 | Fox et al. | |
| 6,587,841 B1 | 7/2003 | DeFrancesco et al. | |
| 6,601,017 B1 | 7/2003 | Kennedy et al. | |
| 6,601,018 B1 | 7/2003 | Logan | |
| 6,601,233 B1 | 7/2003 | Underwood | |
| 6,626,953 B2 | 9/2003 | Johndrew et al. | |
| 6,629,266 B1 | 9/2003 | Harper et al. | |
| 6,694,509 B1 | 2/2004 | Stoval et al. | |
| 6,701,514 B1 | 3/2004 | Haswell et al. | |
| 6,898,784 B1 | 5/2005 | Kossatchev et al. | |
| 6,986,125 B2 * | 1/2006 | Apuzzo et al. | 717/124 |
| 7,028,223 B1 * | 4/2006 | Kolawa | G06F 11/3688 714/37 |
| 7,080,351 B1 | 7/2006 | Kirkpatrick et al. | |
| 7,093,328 B2 | 8/2006 | Givoni et al. | |
| 7,178,063 B1 * | 2/2007 | Smith | G06F 11/3688 714/38.1 |
| 7,181,360 B1 | 2/2007 | Nikolac et al. | |
| 7,366,951 B2 | 4/2008 | Fallah et al. | |
| 7,392,509 B2 * | 6/2008 | Sinha et al. | 717/126 |
| 7,490,319 B2 * | 2/2009 | Blackwell et al. | 717/124 |
| 7,519,864 B2 | 4/2009 | Alam et al. | |
| 7,523,447 B1 * | 4/2009 | Callahan et al. | 717/135 |
| 7,644,398 B2 * | 1/2010 | Cleaveland et al. | 717/135 |
| 7,668,796 B2 | 2/2010 | Hinchey et al. | |
| 7,673,179 B2 * | 3/2010 | LaBanca et al. | 714/38.14 |
| 7,673,292 B2 * | 3/2010 | Vikram | G06F 11/3684 714/38.14 |
| 7,730,461 B2 * | 6/2010 | Chamberlain et al. | 717/135 |
| 7,752,606 B2 * | 7/2010 | Savage | G06F 8/20 717/100 |
| 7,873,944 B2 * | 1/2011 | Bangel et al. | 717/124 |
| 7,895,565 B1 | 2/2011 | Hudgons et al. | |
| 8,078,924 B2 * | 12/2011 | Jibbe | 714/724 |
| 8,166,347 B2 * | 4/2012 | Kirtkow et al. | 714/38.14 |
| 8,185,877 B1 * | 5/2012 | Colcord | 717/127 |
| 8,239,826 B2 * | 8/2012 | Elenburg | G06F 11/3688 717/110 |
| 8,266,578 B2 | 9/2012 | Bazigos et al. | |
| 8,291,387 B2 | 10/2012 | Pal et al. | |
| 8,297,984 B2 | 10/2012 | Rogers et al. | |
| 8,346,897 B2 | 1/2013 | Jaroker | |
| 8,347,108 B2 | 1/2013 | Sridhar et al. | |
| 8,347,267 B2 | 1/2013 | Givoni et al. | |
| 8,352,747 B2 | 1/2013 | Horne et al. | |
| 8,352,923 B2 | 1/2013 | Lopian | |
| 8,381,197 B2 * | 2/2013 | Meenakshisundaram et al. | 717/135 |
| 8,386,419 B2 | 2/2013 | Yalamanchilli | |
| 8,561,036 B1 * | 10/2013 | Beans et al. | 717/140 |
| 2002/0004912 A1 | 1/2002 | Fung | |
| 2002/0133593 A1 | 9/2002 | Johnson et al. | |
| 2002/0133757 A1 | 9/2002 | Bertram et al. | |
| 2002/0138571 A1 | 9/2002 | Trinon et al. | |
| 2002/0143929 A1 | 10/2002 | Maltz et al. | |
| 2002/0147961 A1 | 10/2002 | Charters et al. | |

(56) References Cited

U.S. PATENT DOCUMENTS

| | | |
|---|---|---|
| 2002/0162090 A1 | 10/2002 | Parnell et al. |
| 2002/0165754 A1 | 11/2002 | Tang et al. |
| 2003/0004848 A1 | 1/2003 | Hellerstein et al. |
| 2003/0018952 A1 | 1/2003 | Roetzheim |
| 2003/0028856 A1* | 2/2003 | Apuzzo et al. ............... 717/124 |
| 2003/0033586 A1 | 2/2003 | Lawler |
| 2003/0037314 A1* | 2/2003 | Apuzzo et al. ............... 717/125 |
| 2003/0041000 A1 | 2/2003 | Zajac et al. |
| 2003/0120539 A1 | 6/2003 | Kourim et al. |
| 2003/0144868 A1 | 7/2003 | MacIntyre et al. |
| 2003/0188290 A1 | 10/2003 | Corral |
| 2003/0196190 A1* | 10/2003 | Ruffolo et al. ............... 717/124 |
| 2003/0208351 A1* | 11/2003 | Hartman et al. ................ 703/22 |
| 2003/0212518 A1 | 11/2003 | D'Alessandro et al. |
| 2003/0225662 A1 | 12/2003 | Horan et al. |
| 2003/0225663 A1 | 12/2003 | Horan et al. |
| 2004/0003068 A1* | 1/2004 | Boldman et al. ............. 709/223 |
| 2004/0073890 A1 | 4/2004 | Johnson et al. |
| 2004/0133881 A1* | 7/2004 | Chamberlain et al. ....... 717/125 |
| 2004/0210866 A1* | 10/2004 | Friedman ............ G06F 11/3688 717/106 |
| 2004/0237066 A1 | 11/2004 | Grundy et al. |
| 2005/0071807 A1 | 3/2005 | Yanavi |
| 2005/0114838 A1 | 5/2005 | Stobie et al. |
| 2005/0160321 A1* | 7/2005 | Cleaveland et al. ............ 714/38 |
| 2005/0166094 A1* | 7/2005 | Blackwell ........... G06F 11/3664 714/38.14 |
| 2005/0204201 A1* | 9/2005 | Meenakshisundaram et al. ............... 714/38 |
| 2005/0223295 A1* | 10/2005 | Hermes et al. ................ 714/38 |
| 2005/0240794 A1* | 10/2005 | Sinha et al. ...................... 714/1 |
| 2005/0283761 A1* | 12/2005 | Haas ............................ 717/124 |
| 2006/0085132 A1* | 4/2006 | Sharma et al. .................... 702/1 |
| 2006/0136579 A1 | 6/2006 | Linville et al. |
| 2006/0136788 A1* | 6/2006 | Hsu et al. ....................... 714/42 |
| 2006/0150026 A1* | 7/2006 | Kolawa ............... G06F 11/3688 714/38.14 |
| 2006/0156287 A1* | 7/2006 | Vikram ............... G06F 11/3684 717/124 |
| 2006/0174162 A1* | 8/2006 | Varadarajan .......... G06F 11/263 714/38.14 |
| 2006/0179363 A1* | 8/2006 | LaBanca et al. ................ 714/57 |
| 2007/0006037 A1* | 1/2007 | Sargusingh ......... G06F 11/3692 714/38.11 |
| 2007/0038977 A1* | 2/2007 | Savage ..................... G06F 8/20 717/106 |
| 2007/0074180 A1 | 3/2007 | Hinchey et al. |
| 2007/0079189 A1* | 4/2007 | Jibbe ............................ 714/724 |
| 2007/0130561 A1* | 6/2007 | Siddaramappa .......... G06F 8/10 717/106 |
| 2007/0220347 A1* | 9/2007 | Kirtkow et al. ................ 714/38 |
| 2007/0240116 A1* | 10/2007 | Bangel et al. ................ 717/124 |
| 2009/0070742 A1* | 3/2009 | Voruganti ........... G06F 11/3688 717/124 |
| 2009/0197645 A1 | 8/2009 | Specchio et al. |
| 2009/0300585 A1* | 12/2009 | Meenakshisundaram et al. ............... 717/124 |
| 2011/0088011 A1 | 4/2011 | Ouali |
| 2012/0246612 A1 | 9/2012 | Ji et al. |
| 2012/0317547 A1 | 12/2012 | Lau et al. |
| 2012/0330901 A1 | 12/2012 | Bhagwan et al. |
| 2013/0024847 A1 | 1/2013 | Browne et al. |
| 2013/0061206 A1 | 3/2013 | Smith |

OTHER PUBLICATIONS

Georgakopoulos et al., An Overview of Workflow Management: from Process Modeling to Workflow Automation Infrastructure, Kluwer Academic Publishers, Boston, Distributed Parallel Databases, vol. 3, p. 119-153, 1995.

Betwixt: Turning Beans into XML, Apache Software Foundation, archived Jun. 20, 2002 at <http://web.archive.org/web/20020620000410/http://jakarta.apahce.org.commons/betwixt/>, p. 1 of 1, Nov. 13, 2005.

Muehlen, Business Process Automation and Workflow in the Financial Industry, CSK Software AG, Version 3, p. 1-37, Sep. 10, 2003.

Code Generation for Database Applications, IBM Corporation, p. 1-3, Mar. 1, 2002.

Hudeponhl et al., Integrating Metrics and Models for Software Risk Assessment, The Seventh International Symposium on Software Reliability Engineering (ISSRE '96), p. 93, Oct. 30, 1996.

Reinhart, Liability Management: A new Tool for Financial Consultants, Financial Consultant, vol. 1, No. 3, p. 7-11, Fall/Winter 1996, ISSN 1091-644X, Dialog File 15, Accession No. 01395382.

OS/2EE Database Manager SQLJRA Remote Protocol, IBM Corporation, IBM TDB N10-93, p. 33-36, Jan. 1, 1993.

Quantitative Monitoring of Software Development by Time-Based and Intercheckpoint Monitoring, Software Engineering Journal, vol. 5, Iss. 1, p. 43-49, Abstract, Jan. 1990.

Basili et al., Understanding and Predicting the Process of Software Maintenance Releases, 18th International Conference on Software Engineering (ICSE '96), Mar. 25-29; p. 464; (Abstract).

Wohlin et al., Understanding the Sources of Software Defects: A Filtering Approach, 8th International Workshop on Program Comprehension (IWPC '00), p. 9, (Abstract), Jun. 10, 2000.

Hamilton, JavaBeans, Sun Microsystems, Version 1.01-A, Chapter 8, Aug. 8, 1997, 34 pages.

Pitt and McNiff, java, RMI: The Remote Method Invocation Guide, Addison Wesley Professional, ISBN: 0201-70043-3, Section 3.5, 4 pages.

Castor: Using Castor XML, ExoLab Group, archived Aug. 27, 2001 at http://web.archive.org/web/20010827042213/http://castor.org/xml-framework.html, retrieved from the internet on Nov. 11, 2005, 4 pages.

Mohapatra et al., IEEE International Conference on Software Maintenance (ICSM01), Nov. 07-099, 2001, Florence, Italy, p. 260 Defect Prevention through Defect Predictiojn: A Case Study at Infosys, 1 page.

Agosti Ni et al., A light Workflow Management System Using Simple Process Models, Cooperation Technologies Laboratory, Disco—University of Milano—Bicocca, Viale Sarca 202 20126, Milan Italy, Aug. 2000, 28 pages.

Sammet, Beginning of 4.6 Software Evaluation, Tests and Measurements and RMF I/O Time Validation, Association of Computing Machinery, p. 519, Nov. 1, 1981, 2 pages.

Hilbert et al., An Approach to Large Scale Collection of Application Usage Data Over the Internet, Software Engineering 1998, Proceedings of the 1998 International Conference, Abstract, Apr. 1998, 1 page.

IEEE 100, The Authoritative Dictionary of IEEE Standards Terms, ISBN 0-7381-2601-2, Dec. 2000, p. 950.

Microsoft Computer Dictionary, ISBN 0-7356-1495-4, 2002, p. 446.

Balcer et al., Automatic Generation of Test Scripts from Formal Test Specifications, published by ACM in 1989, pp. 210-218.

* cited by examiner

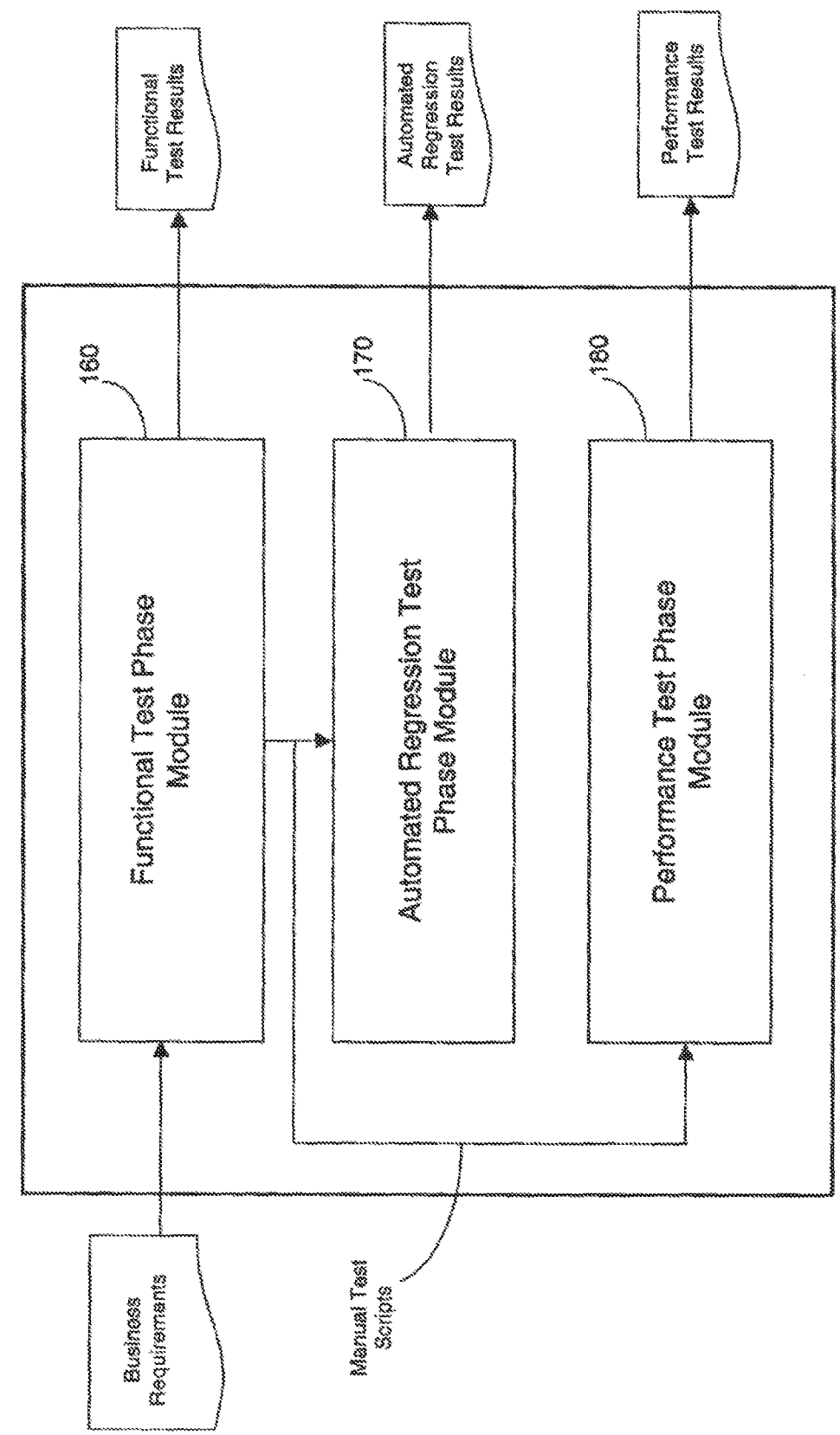

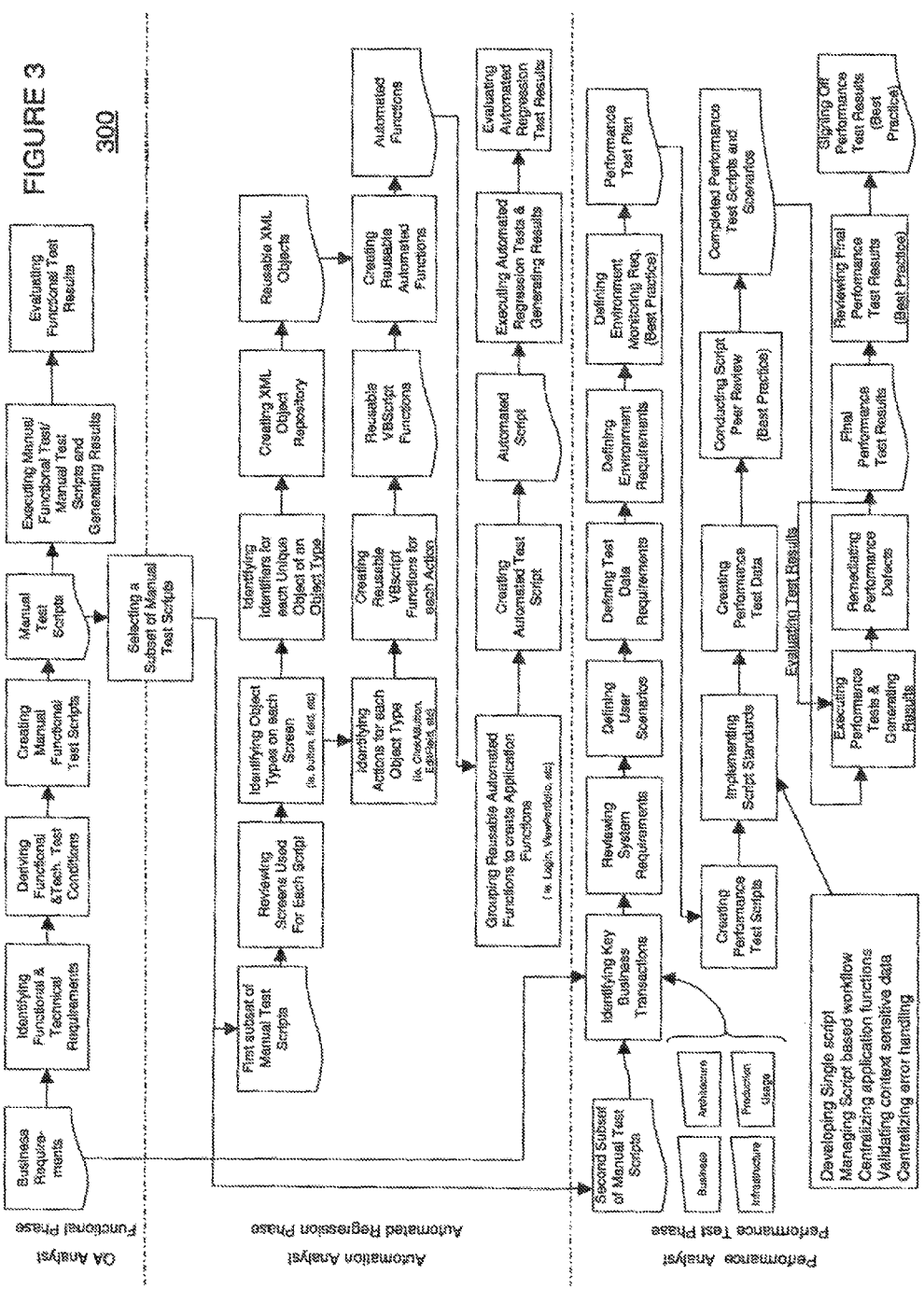

INTEGRATED SYSTEM AND METHOD FOR VALIDATING THE FUNCTIONALITY AND PERFORMANCE OF SOFTWARE APPLICATIONS

CROSS-REFERENCE TO RELATED APPLICATIONS

This application is a continuation of U.S. application Ser. No. 12/979,723, filed Dec. 28, 2010, issued as U.S. Pat. No. 8,434,058, which is a continuation of U.S. application Ser. No. 11/375,043, filed on Mar. 15, 2006, and issued as U.S. Pat. No. 7,895,565. Both of these applications are hereby incorporated by reference.

BACKGROUND

The present invention relates generally to a system and method for efficiently validating the functionality arid performance software applications. In particular, the system and method relates to a multiple test phase integrated process for testing applications, in which the system and method enables the efficient use of test phase deliverables to produce high quality business requirements-based software applications.

Typically web-based software applications are designed to accommodate a multitude of different kinds of business transactions, where each transaction often requires a significant number of functions to be performed In order to complete that transaction. The quality of a software application depends largely on the extensive functionality testing required to validate each function used to execute an on-line transaction and that each on-line transaction is consistent with the business functionality requirements. Software developers recognize that testing software applications is a continuous process that is often time consuming, repetitive and expensive. The testing process is usually divided Into test phases which include unit test, system test, integration, user acceptance testing, customer installation and support test phases. Of the various test phases, phases such as the system test phase, which are designed to validate the functionality and performance of a software application, quite often Involve the largest number of repetitive tests and tasks.

Repetitive testing and other inefficient testing methods are often the result of having the various phases of test performed by separate and Independent organizations that do not communicate with each other. In this type of testing scheme one organization performs the functional tests which involve the creation of requirements-based conditions, test data and manual lest scripts. Another organization independently performs automated regression tests which also involve creating requirements-based test conditions, test data and manual test scripts and a third organization conducts performance tests which again similarly requires the creation of requirements-based test conditions, test data and test scripts.

Those skilled in software test have recognized that the use of independent organizations to perform tests such as those in the functional, automated regression and performance test phases is an overall testing method that results a high degree of duplicative testing. Duplicative testing is highly inefficient, costly and time-consuming. These types of inefficiencies are particularly apparent in the related areas of functional, automated regression and performance phase testing.

In addition to cost and time inefficiencies that may arise from a test process that uses Independent test organizations, quality issues may also he a concern. A quality issue that emerges from separate functional, automated regression and performance phase testing is the reduced level of consistency or coherence between test results from one phase and another. These inconsistencies often stem from the fact that different test organizations, although operating from the same business requirements, may select varying requirements and functions to test.

Variations in the requirements that are selected for test necessarily causes variations in the test data and scripts that are derived from such requirements. It may be the case that after the three test phases have been completed if is discovered that some functions and business requirements of the application were tested in one phase but not in another. Another factor contributing to the inconsistency of test coverage is that the method of testing a particular function or requirement may vary from organization to organization. As a result, variations in the testing methods between phases and organization may lead to a reduced level of confidence in the quality of the software application that has bean tested, even if that application has passed all of the proscribed tests.

Inefficiencies In current testing methods are not exclusively the result of varying testing methodologies of Independent organizations. Test procedure inefficiencies also stem from the current methods or testing toots used to perform the automated regression and performance tests. Standard automated testing tools allow the user to record and playback automatically inputs that are manually entered into the system by an analysts. This method of test is common and may be adequate for relatively small testing jobs but for larger jobs the level of manual repetition is labor and time intensive as wall as extremely costly. Similarly, other inefficiencies may be present in current method for conducting performance tasting. Performance testing inefficiencies may be due to low test coverage, an inappropriate selection of business functions to he tested and duplicative testing.

For the foregoing reasons, in the software testing industry there remains a need for a requirements-based method of testing applications software that is capable of producing consistent, coherent test results from the functional, automated regression and performance phases of testing.

For the foregoing reasons, there is also a need for an end-to-end integrated method for validating the functionality and performance of software applications that allows deliverables, such as functional and technical conditions and manual test scripts to be passed on from one phase to another when conducing functional, automated regression and performance testing In order to expedite the overall system test cycle, enhance efficiencies, produce consistent results from phase to phase and a high level of confidence in the quality of the software application.

For the foregoing reasons, there is also a need for an organizational structure that promotes the integration of testing teams so that communication is enhanced, information is effectively shared, work duplication minimized and testing costs reduced.

For the foregoing reasons, there is a need for a performance testing process that includes the initial identification of key business transactions and the Implementation of script standards that will increase test case coverage, and enhance application quality.

For the forgoing reasons, there is also a need for a functional and automated regression testing method that effectively segments testing tasks within the test phases such that task complexity is efficiently matched to an analyst's level of skill.

SUMMARY

The foregoing disadvantages in the prior art have been successfully overcome by the present invention, which is directed to an integrated method for validating the functionality and performance of a software application which uses a standard software testing tool.

If Is the object of the present invention to provide an end-to-end method of validating the functionality and performance of a software application that integrates the functional, automated regression and performance test phases.

It is another object of the present invention to provide a method of validating the functionality and performance of a software application that leverages deliverables between the functional, automated regression and performance test phases such as to enhance human resource efficiency, reduce fasting errors and to produce high quality application software.

It is yet another object of the present invention to provide an integrated method that uses a common set of requirements-based manual test scripts as input to the functional, automated regression and performance lest phases thereby reducing repetitive testing.

It is yet another object of the present invention to provide an organizational testing framework that uses standard testing tools to more efficiently test the functionality and performance application software.

It is yet another object of the present invention to provide an end-to-end end testing method that enables the functional, automated regression and performance test phases to be performed concurrently and to produce consistent test results.

It is yet another object of the present invention to provide an efficient method of conducting automated regression and performance phase tests which includes segmenting the automated regression and performance test phases such that test analysts may specifically be assigned to perform test segments that match their particular level of skill, thereby minimizing the unnecessary use of highly experienced, costly analysts.

A first aspect of the invention features an integrated method for validating the functionality and performance of software applications through multiple test phases using a common set of business requirements-based manual test scripts. The method Includes the steps of identifying functional and technical requirements from the business requirements for the software application, deriving functional and technical test conditions in a functional test phase that are based on the identified functional and technical requirements, creating manual test scripts based on the functional and technical test conditions using a standard software testing tool, wherein the manual test scripts are created in the functional test phase, executing the manual test scripts and generating test results during the functional test phase using the standard software testing tool accessed through a computer workstation, selecting a first subset of manual test scripts from the manual test scripts that can be used to automate testing during an automated regression test phase, creating automated regression tests based on the first subset of manual test scripts and executing automated regression tests and generating test results during the automated regression test phase using the standard software testing tool.

A second aspect of the invention features an integrated method for validating the functionality and performance of software applications in the functional and performance test phases using a common set of business requirements-based manual test scripts. The method includes the steps of identifying functional and technical requirements based on the business requirements for the software application, deriving functional and technical test conditions based on the identified functional and technical requirements in a functional test phase, creating manual test scripts based on the functional and technical test conditions using a standard software testing tool accessed through a computer workstation, executing the manual test scripts during the functional test phase using the standard software testing tool to execute the manual test scripts, selecting a subset of manual test scripts from the manual test scripts that can toe used during a performance test phase, creating performance tests based on the subset of manual test scripts and executing the performance, tests during performance test phase and generating test results using the standard software testing tool.

A third aspect of the invention features an integrated method for validating the functionality and performance of a software application through multiple test phases using a common sat of requirements-based deliverables. The method includes the steps of identifying functional and technical requirements from the business requirements for the software application, developing deliverables in a functional test phase that are based on the identified functional and technical requirements, creating automated regression tests based on the deliverables, executing the automated regression tests In an automated regression test phase and generating test results using the standard software testing tool and evaluating the test results.

A fourth aspect of the invention features an integrated system for validating the functionality and performance of software applications through multiple test phases using a common set of business requirements-based manual test scripts, the system comprising a functional test phase module configured for identifying functional and technical requirements from the business requirements for the software application, deriving functional and technical test conditions in a functional test phase that are based on the identified functional and technical requirements, creating manual test scripts based on the functional and technical test conditions using a standard software testing tool accessed through a computer workstation, wherein the manual test scripts are created in the functional test phase, and executing the manual test scripts and generating test results during the functional test phase using the standard software testing tool; and an automated regression test phase module configured for selecting a first subset of manual test scripts from the manual test scripts that can be used to automate testing during an automated regression test phase, creating automated regression tests based on the first subset of manual test scripts, executing automated regression tests and generating test results during the automated regression test phase using the standard software testing tool.

Embodiments of the invention may include one or more of the following features. The method may include the steps of selecting a second subset of manual test scripts from the manual test scripts that can fee used during a performance test phase, creating performance tests based on the second subset of manual test scripts and executing performance tests and generating test results during the performance test phase using the standard software testing tool. The method may include the step of evaluating the test results from the manual test scripts execution In the functional test phase for at least two test cycles and validating the results before selecting a first or second subset of manual test scripts to be used for subsequent test phases. The method may also include the step of evaluating the test results from the automated regression tests executed during the automated test phase. The first subset of manual test scripts may Include all manual test scripts. The second subset of manual test scripts may include all manual test scripts. The method may further include the step of evaluating test results from the performance tests executed during the performance test phase and the steps of executing the automated regression tests and the performance tests concurrently. The method may also include the steps of executing the functional tests, the automated regression tests and the performance test concurrently. The method may also Include the steps of executing the functional tests and executing the performance tests concurrently.

Embodiments of the invention may also include one or more of the following features. The deliverables may include functional and technical test conditions, manual test scripts and test results. The method may include the step of developing deliverables which may further include the step of deriving functional and technical test conditions from the Identified functional and technical requirements. The step of developing deliverables may further include the step of creating manual test scripts based on the derived functional and technical test conditions using a standard software testing tool. The step of developing deliverables may further include the steps of executing functional tests based on the derived functional and technical test conditions and generating test results using a standard software tool. The method may further include the steps of creating performance tests based on the deliverables and executing the performance tests in a performance test phase and generating test results using the standard software testing tool. The step of evaluating the test results may further include validating the test results from the functional tests executed during the functional test phase for at least two test cycles before creating the automated regression tests or the performance tests.

Embodiments of the invention may further include a performance test phase module configured for selecting a second subset of manual test scripts from the manual test scripts that can be used during a performance test phase, creating performance tests based on the second subset of manual test scripts and executing performance tests and generating test results during the performance test phase using the standard software testing tool.

BRIEF DESCRIPTION OF THE DRAWINGS

The advantages and features of the integrated method for validating the functionality and performance through multiple test phases using a common sat of requirements-based deliverables, including functional and technical test conditions and manual test scripts will become apparent from the following detailed description, appended claims and accompanying drawings in which like references denote like or corresponding parts, in which:

FIG. 1A depicts an integrated system for validating the functionality and performance of software applications having a functional test phase module, an automated regression test phase module and a performance lest phase module.

FIG. 3 depicts a detailed process flow chart of the integrated multiple phase method of the present invention.

DETAILED DESCRIPTION

Figure 1:
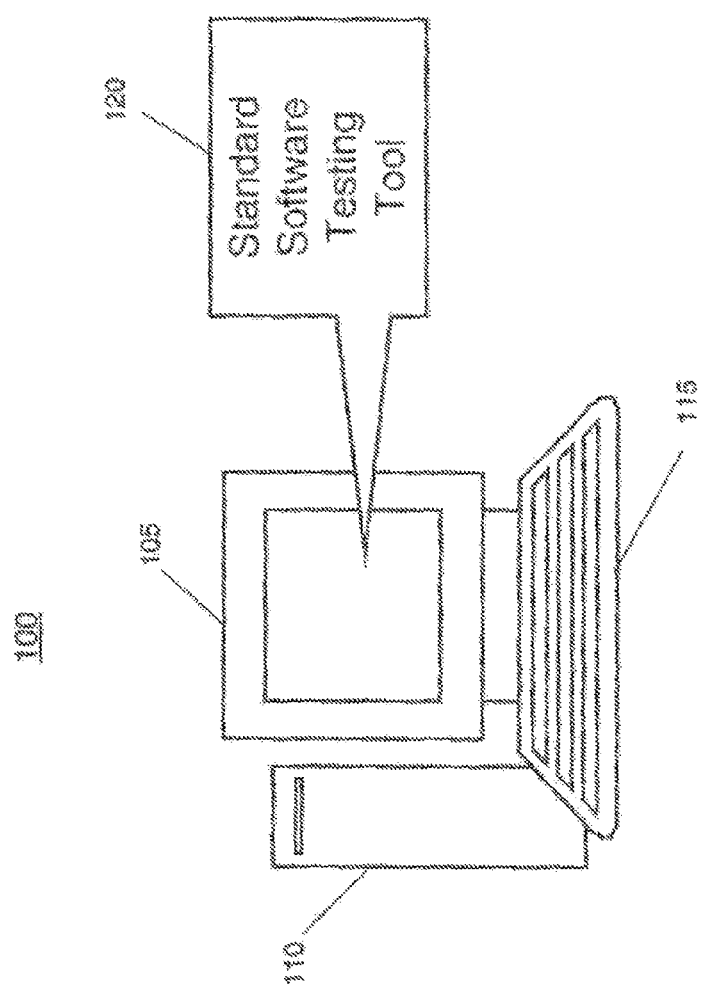
FIG. 1 depicts a computer workstation where a standard web-based software testing tool is accessed through the workstation. The software testing tool is used for functionality testing, manual and automated as well as performance testing.

While the invention is susceptible to various modifications and alternative forms, a specific embodiment thereof has been shown by way of example in the drawings and will herein be described in detail. It should be understood, however, that If is not intended to limit the invention to the particular form disclosed, but on the contrary, the invention is to cover all modifications, equivalents, and alternatives falling within the spirit and scope of the invention as defined by the appended claims.

FIG. 1 depicts computer workstation 180 which provides the user with access to standard software testing fool 120. Standard software fasting tool 120 is used to perform functionality and performance testing. Computer workstation 100 includes monitor 105, computer 110, keyboard 115, access to standard software testing fool 120 and a mouse (not shown). The Integrated method of the present Invention can be Implemented on any workstation that is connected to the Internet, Intranet or any network form of communications. In the embodiments of the present invention discussed below, testing tool 120 is web-based. There are several software testing fools, such as testing fool 120 that are known to and used by these skilled in the software testing arts. Such testing tools facilitate manual functional, automated regression and performance testing. Testing tools including standard tool 120 typically feature central repositories for scripts, data, test cases and projects, in addition to functional and automated test functions, test management, test to requirement traceability, defect traceability and management, program compiler, test result report generation as well as other features that are used in functionality and performance testing. The testing tools are often web-based, because web-based tools conveniently allow users to access the tools and any project developed with the fools from any Internet or Intranet connected workstation, however other types of network platform may also be used. The integrated method discussed herein provides a framework In which to optimally use such software tools during functional, automated regression arid performance testing. This method features the effective use of deliverables, produced during an early phase of a multi-phase test cycle, in subsequent phases to produce high quality software applications, The method presented requires a testing tool; however, its implementation is not dependent on any particular software testing tool that is currently being manufactured.

FIG. 1A depicts an integrated system for validating the functionality and performance of software applications 150 having a functional test phase module 160, an automated regression test phase module 170 and a performance test phase module 180. The modules are configured to provide the user with an integrated system on which to conduct functional, automated regression and performance phase tests using manual test scripts developed in the functional test phase. The functional test phase module 160 is configured for identifying functional and technical requirements, deriving functional and technical test conditions, creating manual functional test scripts and executing manual test scripts and generating test results. The automated regression test phase module 170 is configured for selecting a first subset of manual test scripts from the manual test scripts developed in the functional test phase module that can be used to automate testing during an automated regression test phase, creating automated regression tests based on the first subset of manual test scripts, executing automated regression tests and generating test results during the automated regression test phase using the standard software testing tool.

The integrated system may further include a performance test phase module 180 configured for selecting a second subset of manual test scripts from the manual test scripts developed in the functional test phase module that can be used during a performance test phase, creating performance tests based on the second subset of manual test scripts and executing performance tests and generating test results during the performance test phase using the standard software testing fool The advantage of this integrated system is that it provides the user with the ability to leverage the manual test scripts, developed in the functional test phase module, in subsequent test phases. Leveraging manual test scripts reduces the duplicative testing that occurs when the test phases are executed Independent of each other, increases test coherence because common scripts are used for each phase and increases efficiencies.

Figure 2:
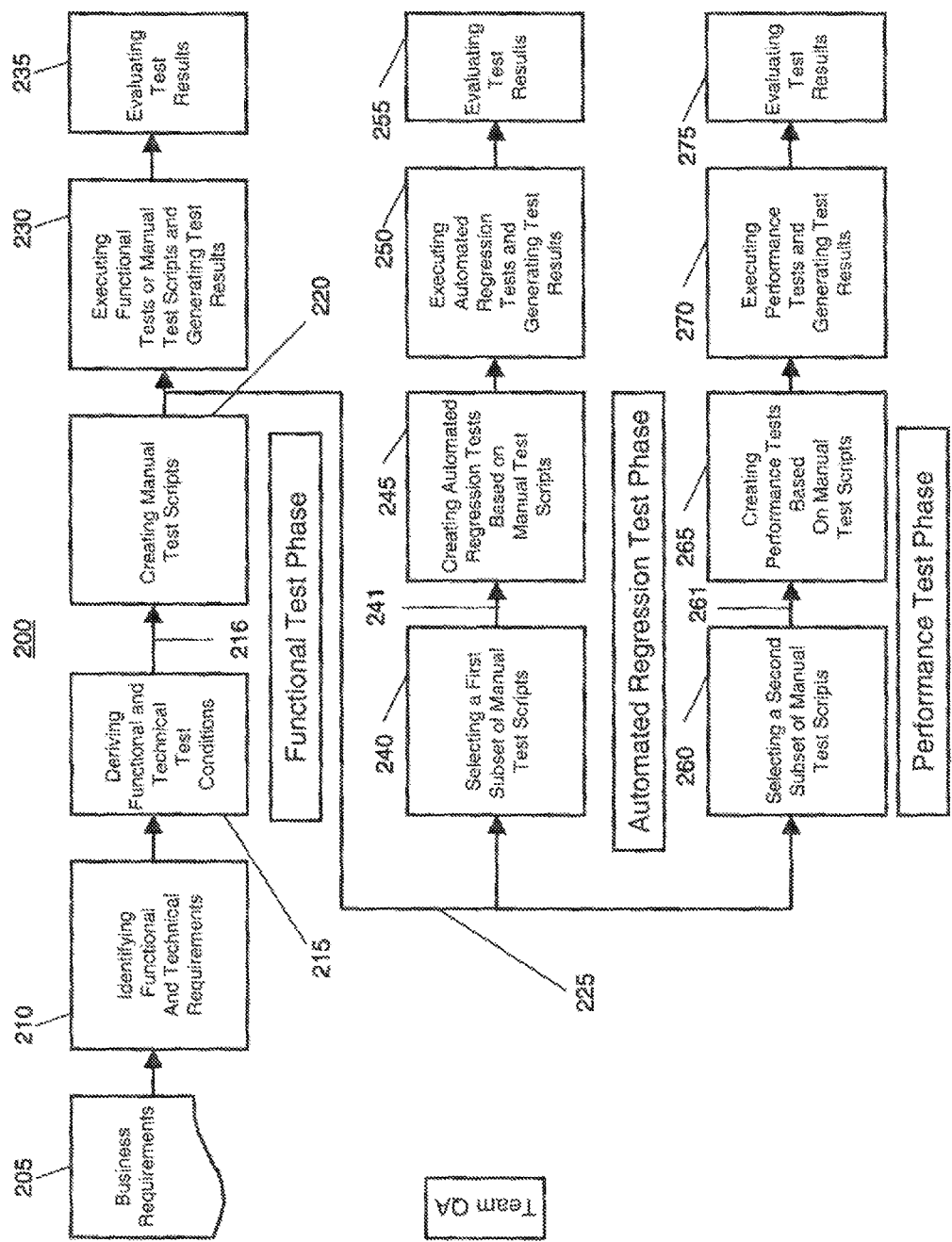
FIG. 2 depicts an embodiment of the integrated multiple phase method of the present invention for validating the functionality and performance of application software.

FIG. 2 depicts an embodiment of the integrated multiple phase method 200 of the present Invention for validating the functionality and performance of applications software. FIG. 2 depicts steps included In conducting three business requirements-based test phases in an integrated manner. The three phases are the functional, automated regression and performance test phases. Referring to FIG. 2, the functional test phase may include the steps of identifying functional and technical requirements 210 from business requirements document 205, deriving functional and technical test conditions 215, creating manual test scripts 220, executing functional tests and generating test results 230. Deriving functional and technical test conditions 215 involves reviewing the identified functional and technical requirements and preparing test data and test conditions for each transaction required by business requirements document 205. Functional and technical test conditions 216 are typically entered info a spreadsheet, preferably an electronic spreadsheet In the spreadsheet, each derived functional test and technical conditions 216 is cross-referenced to a business requirement 205 to maintain test condition-requirement, traceability. Alternatively, business requirement traceability may also be achieved using a requirements management software tool Creating manual test scripts 220 involves inputting derived functional and technical test conditions 218 into software testing tool 120 accessed through workstation 100 and the time-intensive task of manually preparing manual test scripts 225 using testing tool 120 for each derived business requirements-based functional test condition 216. Executing functional tests and generating test results 280 involves running functional tests that include manual test scripts 220 or executing manual test scripts 220 for each functional test condition 218 and generating the test results using test tool 120. The test results, which are the output of step 238, may be generated in the form of a physical report, displayed on computer monitor 105 or in electronic form. Evaluating test results 235 involves reviewing the results and determining whether the results are sufficient relative to the predetermined business requirements, and whether functional and technical test conditions sufficiently exercise each function in the software application-under-test. If the tests fail, functional and technical test conditions 216 and manual test scripts 225 may be modified to better exercise the functional requirements. Functional and technical test conditions 216 and manual test scripts 225 are considered deliverables of the functional test phase. Evaluating test results 235 may include reviewing and validating the test results from the manual test script execution or the functional test execution in the functional phase for at least two fast cycles before performing the steps of selecting a first subset of manual test scripts 240 for the automated regression test phase or selecting a second subset of manual test scripts 260 for the performance test phase. Validating results may include reviewing business requirements, functional and technical test conditions, and manual test scripts.

Another phase of the overall functionality and performance software application validation involves the automated regression test phase. The purpose automated regression tests is to automate lest scripts so that the functionality of the application can be tested more thoroughly. Automated tests can he easily repeated, thereby enabling more functionality testing than is possible with manual functional testing procedures. Both test phases, the manual functional and automated regression test phase Include tests that validate the functionality of the application-under-test. One advantageous feature of the integrated method of the present invention is that it eliminates the necessity of performing the steps of identifying the functional and technical requirements, deriving functional and technical test conditions and creating manual test scripts in the automated regression test phase. These steps are costly and repetitive and are unnecessary when using this method.

Referring to FIG. 2, in the automated regression test phase the step of selecting a first subset of manual test scripts 240 may involve retrieving manual test, scripts 225 from a script repository in testing tool 120 and selecting certain scripts based on a selection criteria that may include selecting the most frequently used functions or the most frequently used tests that have minimal complexity, or selecting infrequently used functions that have minimal complexity relative to other functions. First subset of manual tests 241 may include a portion or all manual test scripts 225. The step of selecting a first subset of manual test scripts 240 enables test analysts to utilize deliverables, which may be manual test scripts 225 that were produced in the earlier functional test phase, as the input to the automated regression test phase. Thereby eliminating repetitive steps of the testing process. The step creating automated regression tests based on manual test scripts 245 may involve preparing automated regression test scripts using techniques that are commonly practiced in the software testing art to create such automated regression test scripts.

Alternatively, the steps of creating automated regression tests based on manual test scripts 245 may involve the steps of the present invention, which is discussed below and depicted in FIGS. 3 and 4.

The automated regression test phase depicted in FIG. 2 includes the step executing automated regression tests and generating test results 250. Step 260 is conducted using software testing tool 120. The step evaluating test results 255 involves reviewing the test results, requirements, functional and technical test conditions, test scripts and determining whether functions were sufficiently tested in the automated test phase and validating results.

In one embodiment of the integrated method an optional performance phase is included in the overall test cycle as shown in FIG. 2. The purpose of performance testing is not only to validate the functionality of the application hut to test the functionality under simulated real world conditions based on technical requirements that were established for that application-under-test. Performance testing typically involves simulating the usage of multiple users.

The step selecting a second subset of manual test scripts 260 may include the stops of reviewing technical test conditions and/or surveying expected volumes for each business function or for the various transactions that comprise each business function. Second subset of manual tests 261 may include a portion or all manual test scripts 225. Integrated method 200 enables the same costly and repetitive steps eliminated in the automated regression test phase to also he eliminated in the performance test phase as well. The step creating performance tests based on manual fast scripts 265 may involve preparing performance test scripts using techniques that are commonly practiced in the software testing art to create such scripts.

Alternatively, the steps of creating performance tests based on manual test scripts 266 may involve the steps of the present invention, which is discussed below and depicted in FIGS. 3 and 5.

The step of executing performance tests and generating test results 270 is also conducted using software testing tool 120. The step evaluating test results 275 may include reviewing test results and determining whether the performance of the application-under-test.

Optionally, integrated method 200 may be conducted so that steps of the functional test phase, automated regression test phase and the performance test phase are performed concurrently after the manual test scripts have been created. Similarly, another option enables the steps of the automated regression test phase and the performance test phase be performed concurrently. Concurrent performance of two or more fast phases is an efficient way of reducing the time that is required to conduct the functionality and performance validation test cycle.

In an alternative embodiment of integrated method 200 shown in FIG. 2 manual test scripts 226 may be leveraged between the functional test and performance test phases only. The steps of this alternative embodiment include many of the same steps discussed above, identifying functional and technical requirements based on the business requirements established for the application-under-test 210; deriving functional and technical test conditions based on the identified functional and technical test requirements in a functional test phase 215; creating manual test scripts based on the functional and technical test conditions using a standard software testing tool accessed through a computer workstation 220; executing the manual test scripts during the functional test phase using the standard software testing tool and generating test results 230; selecting a subset of manual test scripts that can be used during a performance test phase 260; creating performance test, based on the subset of manual test scripts 265; and executing the performance tests and generating test results using the standard software testing tool 270.

The alternative embodiment of the integrated method further optionally includes the step of evaluating the test results from the manual test scripts execution (functional test execution) in the functional test phase for at least two functional test cycles and validating the results before selecting the subset of manual test scripts to be used to create performance tests. A functional test cycle occurs during the functional test phase and may include the steps of deifying functional and technical test conditions 215, creating manual test scripts 220; executing functional tests based on manual test scripts or executing manual test scripts and generating the results 230. Optionally, the steps of the functional test phase and performance test phase are performed concurrently after the manual test scripts have been created.

Figure 2A:
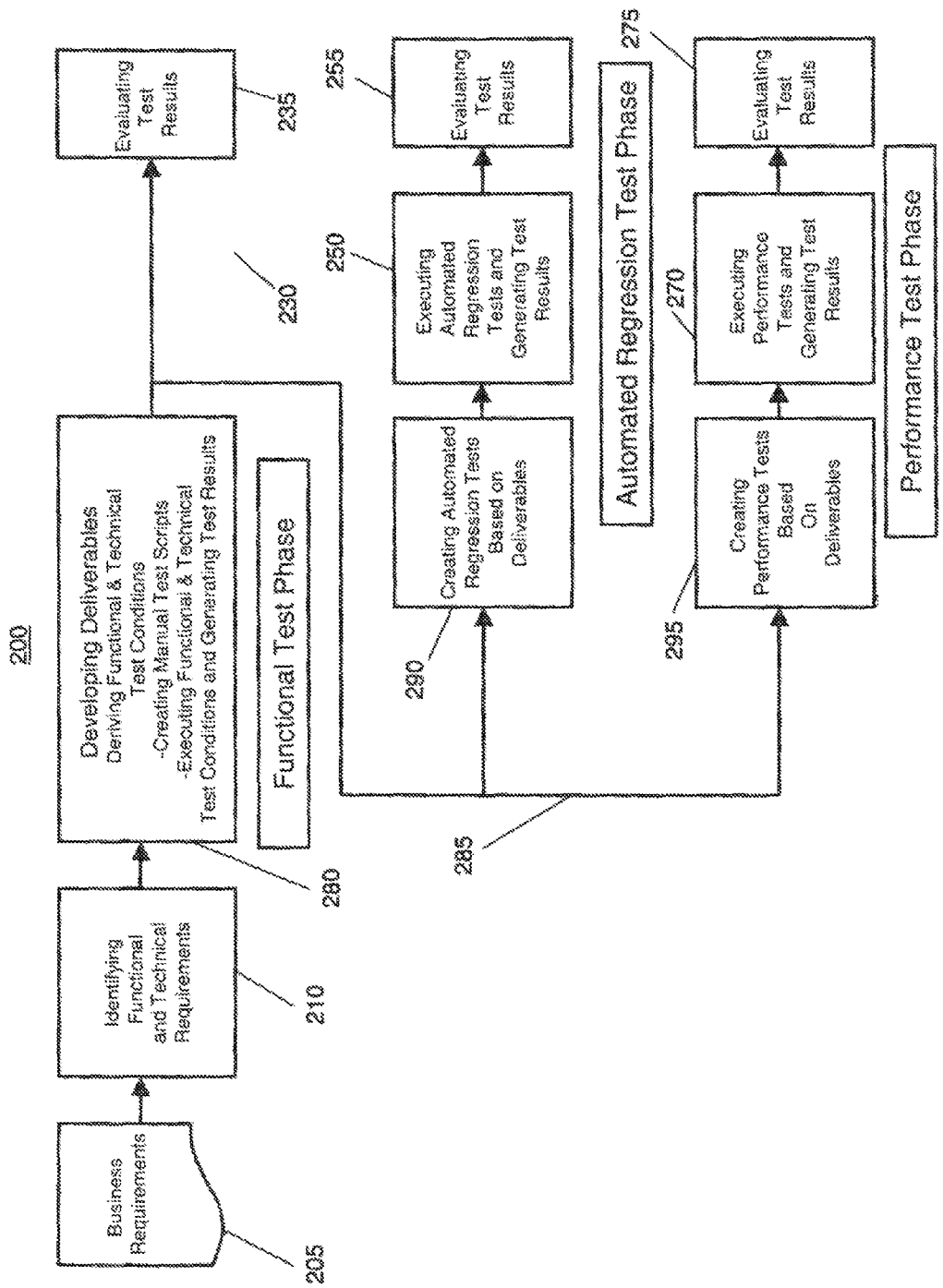
FIG. 2A depicts another embodiment of the integrated multiple phase method of the present invention that uses leveraged deliverables for validating the functionality and performance of applications software.

FIG. 2A depicts yet another embodiment of the integrated multiple phase method of the present Invention which uses leveraged deliverables for validating the functionality and performance of applications software. In this embodiment of the present invention, deliverables may include manual test scripts, functional and technical test conditions, and/or functional test results. The step developing deliverables 280 may Involve the steps of deriving functional and technical test conditions based on the identified functional and technical requirements, creating manual test scripts based on the derived functional and technical test conditions and executing functional tests based on the derived functional and technical test conditions and generating test results using a standard software tool. The deliverables 285 may be used as inputs to the automated regression test phase or the performance test phase or both. The step of creating automated regressions tests based on deliverables 290 may include the step selecting all of the deliverables which includes functional and technical test conditions, manual test scripts and test results or a combination of the types of deliverables for use in creating automated tests scripts and creating automated test scripts. Similarly, deliverables 285 may be selected used as inputs to the performance test phase. Creating performance tests based on deliverables 295 includes the steps of selecting all or a portion of deliverables 285 for use in creating performance test scripts and creating performance test scripts. This integrated method enables deliverables to be utilized as inputs In either the automated regression test phase or the performance test phase or both, reducing repetitive and costly testing. This embodiment of the integrated validation method may incorporate the use of commonly known automated regression and performance testing techniques or the testing techniques of the present invention discussed herein and depicted in FIGS. 3-6.

Each embodiment of the integrated method discussed herein enables organizations to thoroughly and consistently test the functionality and performance of software applications. This method provides an enhanced consistency throughout a muff-phase testing cycle because the inputs or deliverables to each phase of testing are the same and are based on the same functional and technical test conditions and requirements. The output of this integrated method is a fully tested high quality software application.

FIG. 3 depicts a detailed process flow chart of an embodiment of the integrated end to end multiple phase method of the present invention that leverages deliverables such as manual test scripts between the functional, automated regression and performance test phases.

Figure 4:
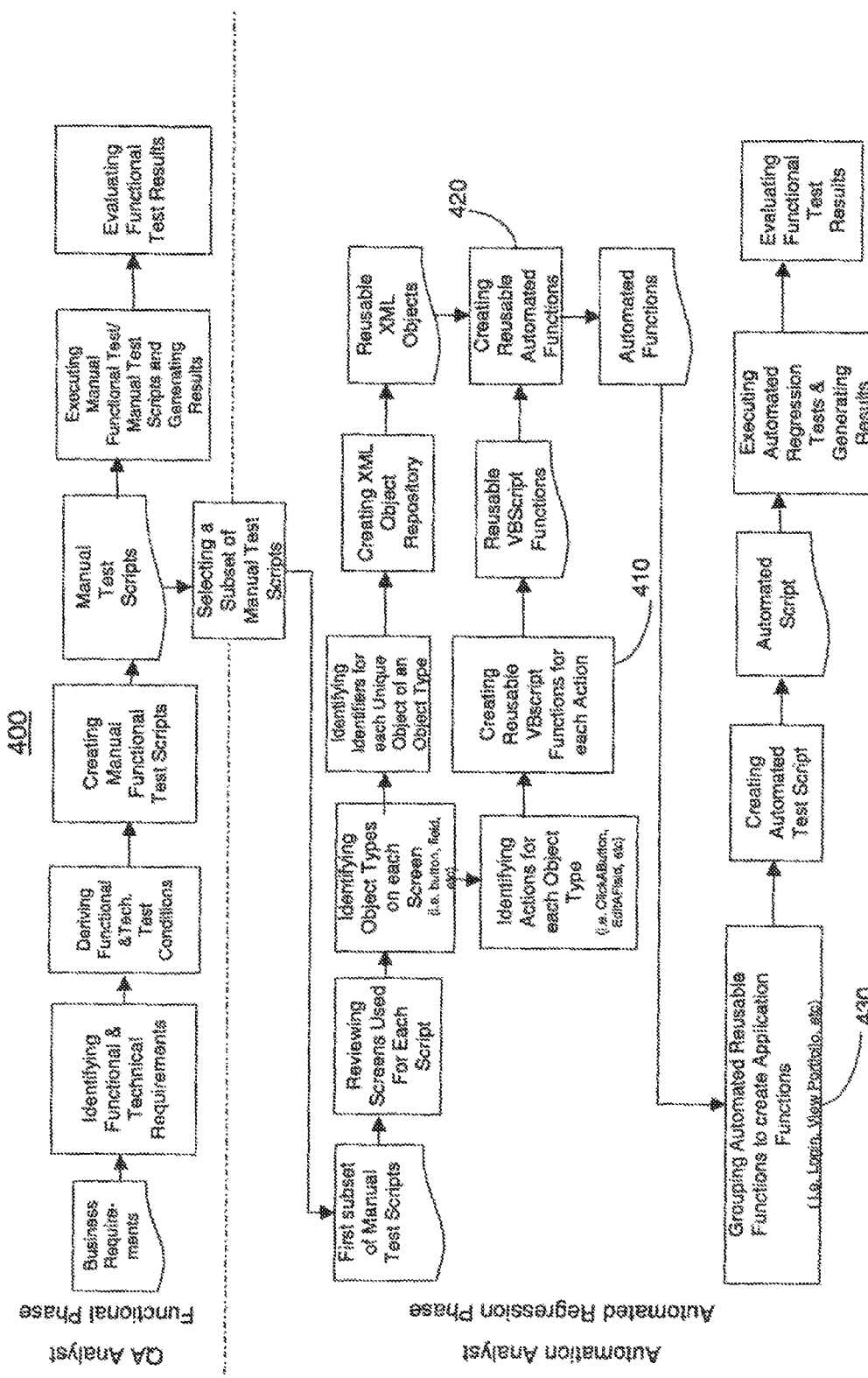
FIG. 4 depicts a detailed process flow chart of the functional and automated regression phases of the present invention.

FIG. 4 depicts a detailed process flow chart of the functional and automated regression test phases 400 in the integrated method of the present invention. The functional phase steps may be the same functional phase step as depicted in FIG. 2. In this embodiment of the automated regression test phase includes the steps of selecting a subset of manual test scripts from the functional phase of testing, creating automated regression tests based on the a first subset of manual test scripts and executing automated regression test and generating test results during the automated regression test phase using the standard software tool The step of creating automated regression tests based on the first subset of manual test scripts further may Include the steps of reviewing screens used for each script from the first subset of manual test script, identifying object types on each of the screens, identifying actions for each object type identified on each of the screens, creating reusable VBscript functions for each action identified, identifying identifiers for each unique object of an object type, creating an XML object repository that contains reusable XML objects, creating reusable automated functions based on the reusable VBscript functions and reusable XML objects to create application functions and creating automated test scripts based on the grouped reusable functions. Integrated method 400 may include the step of evaluating the automated test results. Optionally, the manual test scripts that are the inputs to this automated regression test phase may be created using methods known to those skilled in the art: and are not required to have been created in the functional test phase as depicted in FIG. 4.

Step 410 creating reusable functions for each action involves using a tool specific API or Application Programming Interface to create the code for the functions. Various types of API may he used to create the reusable functions Including VBscript or C programming language. In this embodiment of the present Invention VBscript Is used to create the reusable functions. These functions are used as building block for the automated functions. Automation analysts create code for VBscript functions that describe various actions which may be performed on the various objection a web page. These reusable VBscript functions are flexible enough to be used by all business functions offered by the application. Thus, there are very few functions associated with each object type. For Example; EditAField (field_name, field_value) function can be used for all business functions that Involve editing a field within the application by specifying the name of the field and the value that the user would like to input Into the field. Input values can be data driven from data files or other sources.

Step 420 creating reusable automated functions is based on the reusable VBscript functions and reusable XML objects to create application functions. Automated functions are used as building blocks for automated test cases and test scripts. An automation analyst can develop VBscript functions that describe business functions that are supported by the application. The VBscript functions and the XML objects are used together to create reusable automated function. For example;
 a. Login ( ) function can be built as:
 b. Enter user ID: EditAField("user_id", "MaryJane")
 c. Enter Password: EditAField ("password", "SecretPassword22")
 d. Click Login button: ClickAButton ("Submit")

The advantages of this automated regression test method is that is provides increased flexibility and reusability of commonly used functions and It enables the work process in the functional and automated regression test phases to be segmented so that analyst skill level can be more appropriately matched to task complexity. The five tier segmentation of the automated regression phase and its applicability to human resource allocation is discussed more fully below and depicted in FIG. 6. Another advantage of this automated regression test is that it provide more testing flexibility and reusable than Is provided for in the standard record and play automated test that is currently available in many standard testing tools.

Figure 5:
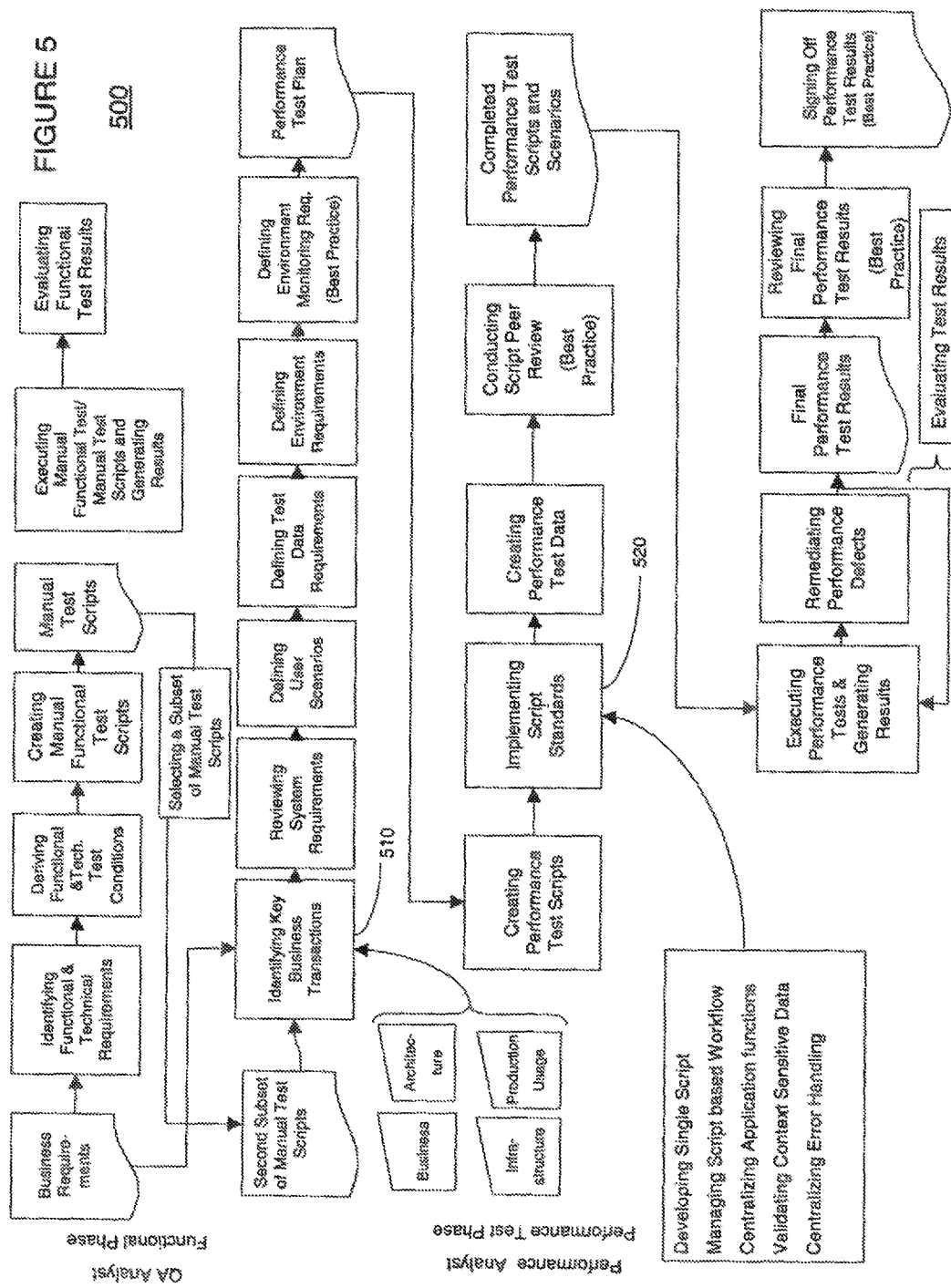
FIG. 5 depicts a detailed process flow chart of the functional and performance phases of the present invention.

FIG. 5 depicts a detailed process flow chart of the functional and performance phases of the present invention. The performance test phase may be conducted using a standard software testing foot capable of executing performance-type tests. In the embodiment shown in FIG. 5 the performance test phase is preferably conducted using deliverables such as manual test scripts from the functional test phase. Inputs to the performance, test phase, however, may be developed independent of functional test phase deliverables. Referring to FIG. 5 an embodiment of present Invention may have a performance test phase that includes the following steps: identifying key business transactions by using a subset of manual test scripts (or a second subset depending on whether the automated test phase is part of the integrated test), reviewing business requirements and a transaction risk-based selection process 510, defining user scenarios, defining test data requirements, defining environment requirements, defining environmental monitoring requirements, creating performance test scripts, implementing script standards 520, creating performance data, conducting script peer review, executing performance tests and generating results, remediating performance defects, reviewing final performance test results and signing of the performance tests results.

The steps defining environment monitoring requirements, conducting script peer review, reviewing final performance test results and signing off performance test am considered best practices and may optionally be including the performance test phase process.

Step 510 implementing key business transactions uses a subset of manual test scripts from the functional test phase, includes a review of the business requirements. Step 510 also includes a transaction risk-based selection process. The transaction risk-based selection process may involve working with the architecture and development teams to determine which application functions are a performance risks and which functions may have response times that are affected by data inputs. Optionally, production statistics, if available may be applied to application functions to determine the transaction volume risk. If production statistics are not available then the analysts should work with the business to determine the transaction volume risk based on forecasted user behaviors.

Step 510 also may include the step of determining business criticality risk for application functions. Risk levels for performance, volume and business criticality may be ranked as H-high, M-medium or L-low and whether it is input driven (Y-yes or N-no). Step 510 may further include assigning a score to each function based on its ranking. The score assignments include H=3 points, M=2 points, L=1 point, Y=1 point and N=0 points. All application functions with a score of 5 or higher will be included In the, performance test. Key application functions are used to select manual test cases that best represent normal business processing. Selected test cases may then be broken down into individual transactions.

One of the advantages of using this using this risk-based transaction selection process Is that it improves test coverage. This selection process may in some cases provide up to 98 percent coverage of the test cases, Coverage of ninety-eight percent is a substantial improvement over the industry standard for performance testing, which is typically about 60 percent coverage.

Step 520 implementing script standards may include the steps of developing a single script, managing script based workflow, centralizing application functions, validating context sensitive data and centralizing error handling.

Developing a single script includes combining individually developed scripts into one main script prior to execution. Moreover, during this process transactions Identified throughout the risk-based transaction selection process will be documented into a user scenario. Each user scenario is scripted as a section within the script. Each section may request additional functions that are shared within the script. One advantage of this centralized single script process is that having one main script reduces the amount of script maintenance that is required during and after script execution and test execution. Another advantage of having a centralized single script is that output is increased. Yet another advantage of this process is that it enables changes to user requirements, transaction ratios, application builds and transaction execution rates that occur during execution to be incorporated into the test with a reduced turnaround time and increased reliability. An example the advantage of developing a single script is as follows:

a. A typical test can have between 10-20 user scenarios,
b. If each one of these were a separate script and the number of users increased with all other tasks being equal then all 10-20 user levels would have to be recalculated and each new user level would have to be entered manually in 10-20 locations, increasing the chance of human error.
c. Errors would result in loss of execution cycles.
d. With only one script, the total user level would only have to be entered Into a single location.

Managing script based workflow involves removing workflow management from the software test tool's Graphic User interface or GUI and placing it within the script. Having management within the script eliminates granularity limitations that inherent in many standard software testing fools that control the test execution process. Typically, standard software testing fools limit user scenarios execution granularity to a minimum of approximately one percent. Software testing tools typically require the workflow to be setup using proprietary files which are difficult to understand, distribute and manipulate outside of the software tool's graphical user interface. In contrast, the script based workflow resides in a simple text file. One advantage of the script based workflow process of the present invention is that flatten files can be easily distributed, attached to any email, opened In a text editor and can easily modified. Another advantage of the managing script based workflow process is the increased granularity provided. For example, user scenarios may be executed at 0.5 or as low as 0.001 percent granularity.

Centralizing application functions organizes shared application functions such as "login" and "logout. " Centralization eliminates multiple areas where errors may occur when the login/logout functionality is changed or the user access rights are changed. These types of errors typically occur when a new application version is released or during the issue resolution phase of execution. It is recommended that the use of "goto" statements should be avoided and functions calls used instead. Generally, "goto" statements are more difficult to follow and therefore rapid script/debug is more difficult to achieve.

Validating context sensitive data includes confirming that the proper data is being displayed by the application. In some cases when an application is operating under load conditions, erroneous data Is sent to the user when a proper request is entered. This validating step enables these types of errors to be discovered during the performance test execution. If the data is not context sensitive most to these types of errors would not be discernable.

For example:
a. When Ted Langy logs info the application, he receives a page stating "Welcome Ted Langy."
b. The application will only state "Welcome Ted Langy" when he logs in.
c. If Laura Wilcox logs in, it states "Welcome Laura Wilcox."
d. To verify with context sensitive validation there has to be a check that will change based on what user logs in.

Centralizing error handling provides a means to capture all errors that occur during the execution of a performance test application, script or data setup and still allow the script to run without producing repetitive erroneous failures. In order to accomplish this, after an error occurs the details of that error are captured (typically a screenshot). the script then exits the application and subsequently re-launches the application. This permits the script to start fresh and continue similar to the behavior of an actual user. The advantage of centralizing error handling is that error handling functions can easily be updated when they are centralized. Using a function call Instead of several lines of code eliminates unnecessary clutter from the script.

The advantages of this embodiment of the performance test phase of the present invention are the ability to determine whether an application will support production volumes In a controlled environment, reduced risk of performance errors found in production, the ability to detect infrastructure and architecture issues not detectable in functional phase testing, increased input into infrastructure and architecture scalability planning as well as increased test case coverage from the industry standard of 20% up to as much as 60%).

Figure 6:
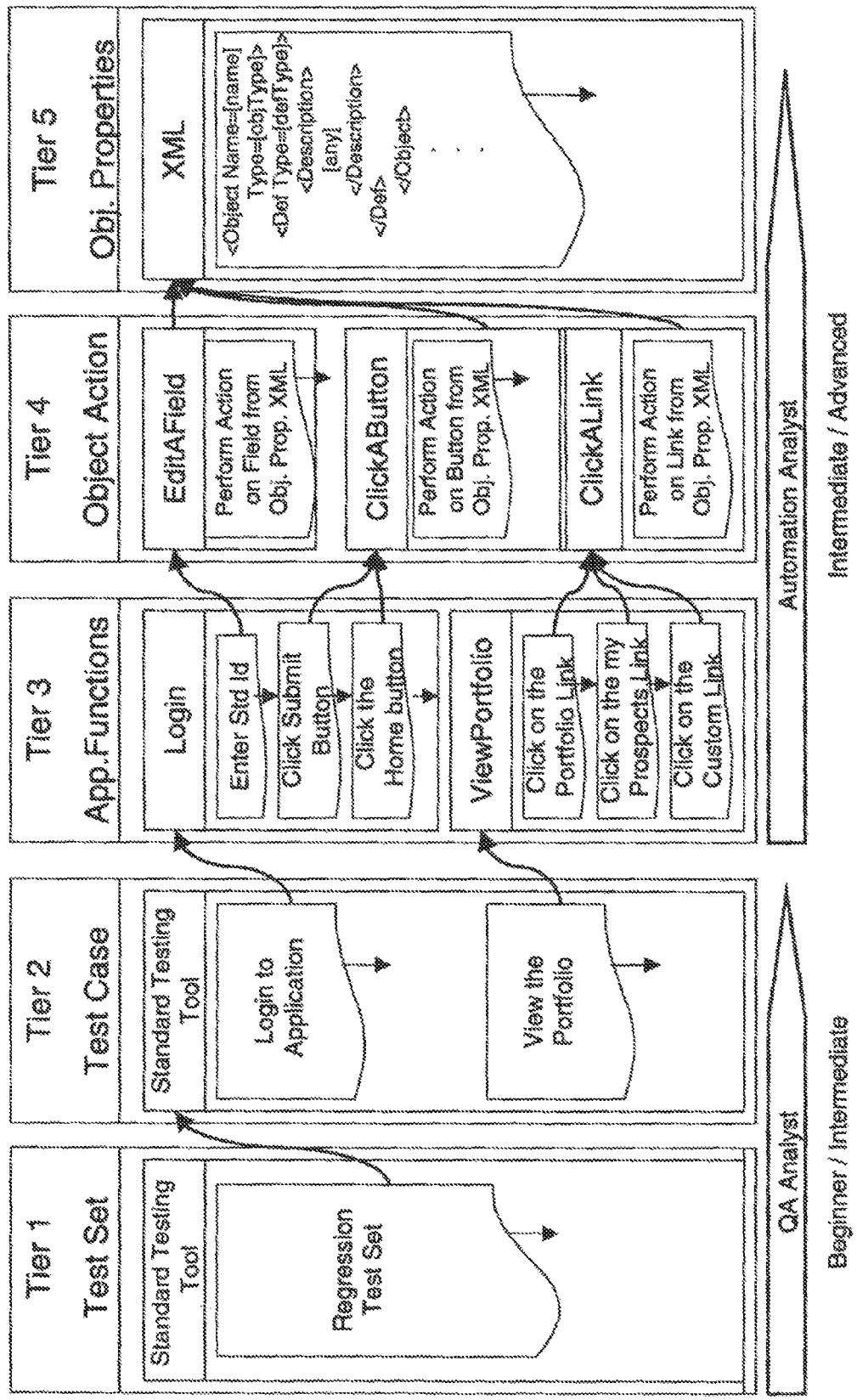
FIG. 6 depicts the five tier segmentation feature of the present invention.

FIG. 6 depicts the five tiered segmentation framework of the present invention for the automated regression test phase. Referring to FIG. 6, this five tiered framework provides a scheme whereby the skill level of analysts can effectively and efficiently be matched with a particular task. FIG. 6 correlates specifically to the automated regression method shown in FIGS. 3 and 4. The automated regression process is segmented into five tiers.

Tier 1 involves the execution of a test set or a group of test cases. Task that fall within this tier may be executed by an analyst with a beginner or intermediate skill level. Similarly, Tier 2 involves the execution of test cases and requires the same level of skill as Tier 1. Tier 3 involves the creation of application functions which requires an analyst to have sufficient skill to create code for reusable automated functions. Therefore, the skill level required for Tier 3 is intermediate or advanced skills. Tier 4 involves the creation of generic object action which requires an analyst with intermediate or advanced knowledge of VBscript code creation for reusable functions for each action. Tier 5 which involves creating code for reusable XML objects also requires intermediate and advanced knowledge.

This tiered framework also facilitates skill level and task matches in the functional test and performances test phase as well. The entire functional phase would be considered to involve Tier 1 level tasks. Therefore, any beginner or Intermediate level analyst should be able to execute all tasks In the functional test phase, Conversely, most tasks in the performance test phase require an analyst with advanced skilled.

Tier 5 consists of XML code that is developed to perform specific functions during the testing process. Tier 4 consists of the XML code from Tier 5 broken up into disparate object actions that correspond to particular features or functions of the code. Thus, object actions may include "EditAField," "ClickAButton," or "ClickALink." Tier 3 may be considered the boundary between technical/object coding and the business application requirements. Tier 3 may include specific categories of object actions from Tier 4 that when grouped create application functions such as "login" or "ViewPortfolio." Tier 2 may include a collection of particular application functions from Tier 3. Tier 1 may Include a group of test cases and be referred to as a test set.

The advantages of this segmentation framework, particularly in the automated regression test phase, are enhanced testing efficiencies, increased human resource productively, fewer resources required, reduced risk of data related errors, reduced test cycle time, increased test case coverage (from 60% to as much as 98%), and Improved test accuracy.

The integrated method for validating the functionality and performance of software application of the present invention provides a method to more efficiently produce software applications with increased reliability, fewer defects and at a reduced cost. This integrated method is preferably implemented by one unified organization that focuses on The integrated method of the present invention may be used by any software application testing organization that engages validating the functionality and performance of software applications. This method provides users with an organized framework to use existing software fasting tools more efficiently and to allocate human resources more effectively.

An advantage of the integrated method of the present invention is that is provides a framework for testing organizations to use standard tasting tools more efficiently by leveraging deliverables between phases in a multi-phase functionality and performance testing cycles.

Another advantage of the integrated method of the present invention is that it facilitates enhanced communication between analysts performing different tests in different phases of the functionality-performance test cycle and the sharing of deliverables between phases to increase productivity and efficiency.

Yet another advantage of the integrated method of the present invention is that the test results from the functional, automated regression and performance test phases are more consistent with each other because the Inputs to each phase are the same, i.e. the same application functions are tested using the same requirements-based deliverables.

Yet another advantage of the integrated method of the present invention is that it may enable organizations to reduce cost expenditures that are typically associated with repetitive functionality and performance testing.

The present invention does not require all of the advantageous features and all of the advantages to be incorporated In every embodiment of the invention, Moreover, although the present invention has been described in considerable detail, with reference to certain embodiments, other embodiments are possible. Therefore, the spirit and scope of the appended claims should not be limited to the description of the embodiments contained herein.

What is claimed is:

1. An integrated method for validating the functionality and performance of software applications through multiple test phases using a common set of business requirements-based manual test scripts, the method comprising the steps of:
   deriving software application test conditions;
   generating manual test scripts based on the software application test conditions;
   creating, using at least one processor, functional tests for a functional test phase based on the generated manual test scripts;
   selecting, for an automated regression test phase, a first subset of the generated manual test scripts, the selecting based on attributes of the generated manual test scripts and the functional tests created for the functional test phase;
   creating automated regression tests for the automated regression test phase based on the selected first subset of manual test scripts, wherein creating automated regression tests comprises:
      identifying object types;
      identifying actions;
      creating reusable functions for each action identified;
      identifying identifiers for each unique object of the identified object types;
      creating automated functions based on the reusable functions and a plurality of reusable Extensible Markup Language (XML) objects; and
      creating automated test scripts including a plurality of the automated functions for the automated regressions test; and
   automatically executing the functional test phase and the automated regression test phase concurrently.

2. The method as recited in claim 1, further comprising the steps of:
   selecting a second subset of manual test scripts from the manual test scripts;
   generating performance tests based on the second subset of manual test scripts, wherein the performance tests validates the functionality of the software application; and
   executing, using at least one processor, performance tests concurrently with the automated regression tests.

3. The method as recited in claim 2, wherein the step of creating performance tests based on the second subset of manual test scripts further comprises the steps of:
   identifying key business transactions; and
   implementing script standards.

4. The method as recited in claim 2, wherein the step of creating performance tests based on the second subset of manual test scripts further comprises the steps of:
   reviewing system requirements;
   defining user scenarios;
   defining test data requirements;
   defining environment requirements; and
   creating performance test data.

5. The method as recited in claim 2, further comprising the step of evaluating test results from the performance tests executed.

6. The method as recited in claim 5, wherein the step of evaluating test results from the performance tests further comprises the steps of remediating performance defects, executing performance tests and generating results.

7. The method as recited in claim 2, wherein the steps of generating and executing of performance tests are performed before the step of executing the automated regression tests.

8. The method as recited in claim 1, further comprising the steps of
   generating test results based on the manual test scripts processed; and
   evaluating the test results for at least two test cycles and validating the results before selecting a first or second subset of manual test scripts to be used for subsequent test phases.

9. The method as recited in claim 1, further comprising the step of evaluating the test results from the automated regression tests executed during the automated test phase.

10. The method as recited in claim 9, wherein the step of evaluating the test results comprises remediating performance defects and generating results.

11. An integrated method for validating the functionality and performance of software applications in the functional and performance test phases using a common set of business requirements-based manual test scripts, the method comprising the steps of:
- deriving software application test conditions;
- generating manual test scripts based on the software application test conditions;
- creating, using at least one processor, functional tests for a functional test phase based on the generated manual test scripts;
- generating performance tests based on at least one processed script of the manual test scripts;
- selecting, for an automated regression test phase, a first subset of the generated manual test scripts, the selecting based on attributes of the generated manual test scripts and the functional tests created for the functional test phase;
- generating automated regression tests for the automated regression test phase based on the selected first subset of manual test scripts, wherein generating the automated regression tests comprises:
  - creating reusable functions for each action identified;
  - creating automated functions based on the reusable functions and reusable Extensible Markup Language (XML) objects;
  - grouping reusable automated functions to create grouped reusable automated functions; and
  - creating automated test scripts including a plurality of grouped automated functions for the automated regressions test; and
  - executing, using at least one processor, the automated regression tests; and
- executing, using at least one processor, the performance tests;
- automatically executing the functional test phase and the automated regression test phase concurrently.

12. The method as recited in claim 11, wherein the step of generating performance tests based on at least one processed script of the manual test scripts further comprises the steps of:
- identifying key business transactions by using the subset of manual test scripts, reviewing business requirements and using a transaction risk-based selection process; and
- implementing script standards that include the steps of developing a single script, managing script based workflow, automatically centralizing application functions, validating context sensitive data, and automatically centralizing error handling.

13. An integrated system for validating the functionality and performance of software applications through multiple test phases using a common set of business requirements-based manual test scripts, the system comprising:
- a functional test phase module that derives software application test condition, generates, using at least one processor, manual test scripts based on the software application test conditions, and processes, using at least one processor, the manual test scripts; and
- an automated regression test phase module that creates and executes automated regression tests based on a first subset of processed manual test scripts, the automated regression test phase module creates the automated regression tests by performing at least the steps of:
- selecting a first subset of the generated manual test scripts, the selecting based on attributes of the generated manual test scripts and the functional tests created for the functional test phase; identifying object types, identifying actions for each object type identified, creating reusable functions for each action identified; identifying identifiers for each unique object of the identified object types; creating automated functions based on the reusable functions and a plurality of reusable Extensible Markup Language (XML) objects; and creating automated test scripts based on the automated functions; and
- automatically executing the functional test phase and the automated regression test phase concurrently.

14. The system as recited in claim 13, further comprising:
a performance test phase module configured for creating performance tests based on a second subset of manual test scripts and executing the performance tests.

15. The system as recited in claim 14, wherein the performance test phase module is further configured for identifying key business transactions by using the second subset of manual test scripts, reviewing business requirements and using a transaction risk-based selection process and implementing script standards based on a single script, a script based workflow management, centralized application functions, context sensitive data validation, and centralized error handling.

16. The system as recited in claim 14, wherein the performance test phase module is further configured for generating test results and evaluating the test results from the performance tests executed.

17. The system as recited in claim 16, evaluating the test results includes remediating performance defects, executing performance tests and generating results.

18. The method as recited in claim 14, wherein performance test phase module is configured to generate and execute the performance tests before the executing of the automated regression tests by the automated regression test phase module.

19. The system as recited in claim 13, wherein the functional test phase module is further configured for generating test results based on the manual test scripts processed, evaluating the test results for at least two test cycles and validating the results before selecting a first or second subset of manual test scripts to be used for subsequent test phases.

20. The system as recited in claim 13, wherein the automated regression test phase module is further configured for evaluating the test results from the automated regression tests.

* * * * *